(12) United States Patent
Colin et al.

(10) Patent No.: US 11,419,443 B2
(45) Date of Patent: Aug. 23, 2022

(54) ACCESSORY HOOK (71) Applicant: HERMAN MILLER, INC., Zeeland, MI (US)

(72) Inventors: Kimberlee Colin, London (GB); Luca Corvatta, London (GB); Samuel Hecht, London (GB); Joshua DeWys, Marne, MI (US); Kevin Miller, Lawton, MI (US)

(73) Assignee: MillerKnoll, Inc., Zeeland, MI (US)

( * ) Notice: Subject to any disclaimer, the term of this patent is extended or adjusted under 35 U.S.C. 154(b) by 0 days.

(21) Appl. No.: 17/086,934

(22) Filed: Nov. 2, 2020

(65) Prior Publication Data
US 2022/0133070 A1 May 5, 2022

(51) Int. Cl.
*A47G 29/08* (2006.01)
*F16B 2/08* (2006.01)
*F16M 13/02* (2006.01)

(52) U.S. Cl.
CPC .............. *A47G 29/08* (2013.01); *F16B 2/08* (2013.01); *F16M 13/022* (2013.01); *A47G 29/083* (2013.01)

(58) Field of Classification Search
CPC ......... A47G 29/08; A47G 29/083; F16B 2/08; F16M 13/022; F21V 21/088
USPC ......... 248/227.3, 316.7, 316.6, 316.5, 316.1, 248/316.2, 228.5, 228.7, 228.3, 229.14, 248/229.15, 229.16, 229.17, 229.23, 248/229.24, 229.25, 229.26, 229.11, 248/231.85, 230.9, 227.1, 227.4, 230.7, 248/231.61, 231.71, 231.81; 24/16 R, 24/16 PB, 20 TT, 598.2; 70/458
See application file for complete search history.

(56) References Cited

U.S. PATENT DOCUMENTS

| | | | | |
|---|---|---|---|---|
| 1,046,177 A | * | 12/1912 | Graham | A01K 15/02 119/814 |
| 1,294,135 A | * | 2/1919 | Marble | B23B 31/008 279/39 |
| 1,685,686 A | * | 9/1928 | Smith | B62D 1/043 74/557 |

(Continued)

FOREIGN PATENT DOCUMENTS

CN 201929643 U 1/2011

OTHER PUBLICATIONS

Moll, Champion children desk more than just a desk, the Champion, https:1/moll-funktion.com/en/products/moll-champion/, webpage accessed Jul. 15, 2020, (29 Pages).

(Continued)

*Primary Examiner* — Nkeisha Smith
(74) *Attorney, Agent, or Firm* — Michael Best & Friedrich LLP (57) ABSTRACT

An accessory hook includes a support and a clamp being moveable between an open position and a closed position. The clamp has a collar including a first region and a second region, and a projection including a first portion extending from the first region of the collar and a second portion extending from the second region of the collar. In the open position, a gap is formed between the first portion of the projection and the second portion of the projection. In the closed position, the gap is closed, and the support at least partially surrounds the projection to hold the first portion and the second portion together.

19 Claims, 6 Drawing Sheets

(56) References Cited

U.S. PATENT DOCUMENTS

| | | | | |
|---|---|---|---|---|
| 1,822,389 | A * | 9/1931 | Blakely | F16B 2/08 403/199 |
| 2,916,223 | A * | 12/1959 | Klim | A47K 10/3836 242/597.8 |
| 3,116,528 | A * | 1/1964 | Poe | F16B 21/075 411/15 |
| 3,357,294 | A * | 12/1967 | Steadmon | F16B 21/071 411/520 |
| 3,385,615 | A * | 5/1968 | Hussey | F16B 2/08 403/235 |
| 4,821,988 | A | 4/1989 | Jimenez | |
| 4,958,791 | A * | 9/1990 | Nakamura | F16L 3/23 248/74.1 |
| 5,028,161 | A * | 7/1991 | Peleg | F16B 7/044 403/24 |
| 5,366,147 | A | 11/1994 | Morgan et al. | |
| 6,409,131 | B1 | 6/2002 | Bentley et al. | |
| 6,588,716 | B1 | 7/2003 | Heid | |
| 8,001,931 | B2 * | 8/2011 | Deese | A01K 5/0142 119/61.57 |
| 10,022,006 | B1 | 7/2018 | Williams | |
| 2010/0299892 | A1 * | 12/2010 | Ardern | F16L 3/12 24/481 |
| 2018/0073256 | A1 * | 3/2018 | Lutes | F16M 13/022 |

OTHER PUBLICATIONS

Midcentral Medical, Urinal Bag Hook, https://www.midcentralmedical. com/store/iv-pole-accessories/urinal-bag-hook/, Copyright 2020, (4 Pages).

Juan Gadget, Pxel AA-UC7 Metal U Clamp Clip with Hook for Weight Sand Bag, Boom Arm, https://www.juangadget.com/products/ pxel-aa-uc 7-metal-u-cla mp-clip-with-hook-for-weight-sand-bag- boom-arm-stand-support-kit-photo-video-st., Copyright 2020, (13 Pages).

Clinton Industries, Model #IV-41 Universal Clamp, https://www. clinton-ind.com/product/iv-41-universa l-clamp, Copyright 2020, (10 Pages).

* cited by examiner

FIG. 9

ACCESSORY HOOK

FIELD OF THE INVENTION

The present disclosure relates to accessory hooks and, more particularly, accessory hooks for furniture items.

SUMMARY

In one embodiment, an accessory hook includes a support and a clamp being moveable between an open position and a closed position. The clamp has a collar including a first region and a second region, and a projection including a first portion extending from the first region of the collar and a second portion extending from the second region of the collar. In the open position, a gap is formed between the first portion of the projection and the second portion of the projection. In the closed position, the gap is closed, and the support at least partially surrounds the projection to hold the first portion and the second portion together.

In another embodiment, an accessory hook includes a support having a sleeve. The sleeve has a recess and first threads positioned within the sleeve. The accessory hook also includes a clamp having a collar including a first region and a second region, and a projection including a first portion extending from the first region of the collar and a second portion extending from the second region of the collar. The first portion and the second portion together define a boss having second threads. The sleeve receives the projection and the first threads engage the second threads of the boss to inhibit separation of the first and second portions.

In a further embodiment, an accessory hook, for use with a furniture item, includes a support and a clamp. The clamp has a collar including a first region and a second region, and a projection including a first portion extending from the first region of the collar and a second portion extending from the second region of the collar. The collar is elastically deformable and configured to wrap around part of the furniture item. The support engages the projection while the clamp is wrapped around the part of the furniture item to secure the clamp on the furniture item.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-5 illustrate an accessory hook 10. The accessory hook 10 may help hold or support accessories (e.g., bags, headphones, jackets, purses, cases, cords, etc.) on a furniture item 12. The accessory hook 10 is shaped to fit over the furniture item 12 and to clamp tightly to the furniture item 12. In the illustrated embodiment, the furniture item 12 is a leg of a table. The leg may have a cross-sectional shape that is circular, square, rectangular, rounded, hexagonal, oblong, irregular, and the like. The leg may also be part of a height-adjustable table or a fixed-height table. In some embodiments, the accessory hook 10 may also be positioned on other portions of the table, such as a horizontal support bar underneath or above of a work surface of the table. In other embodiments, the accessory hook 10 may be positioned on other types of furniture items, such as a desk leg or support, a couch or chair leg, a bedpost, a lamppost, a shelving unit, a wall bracket or shelf, or other suitable structure having a relatively narrow section.

Figure 1:
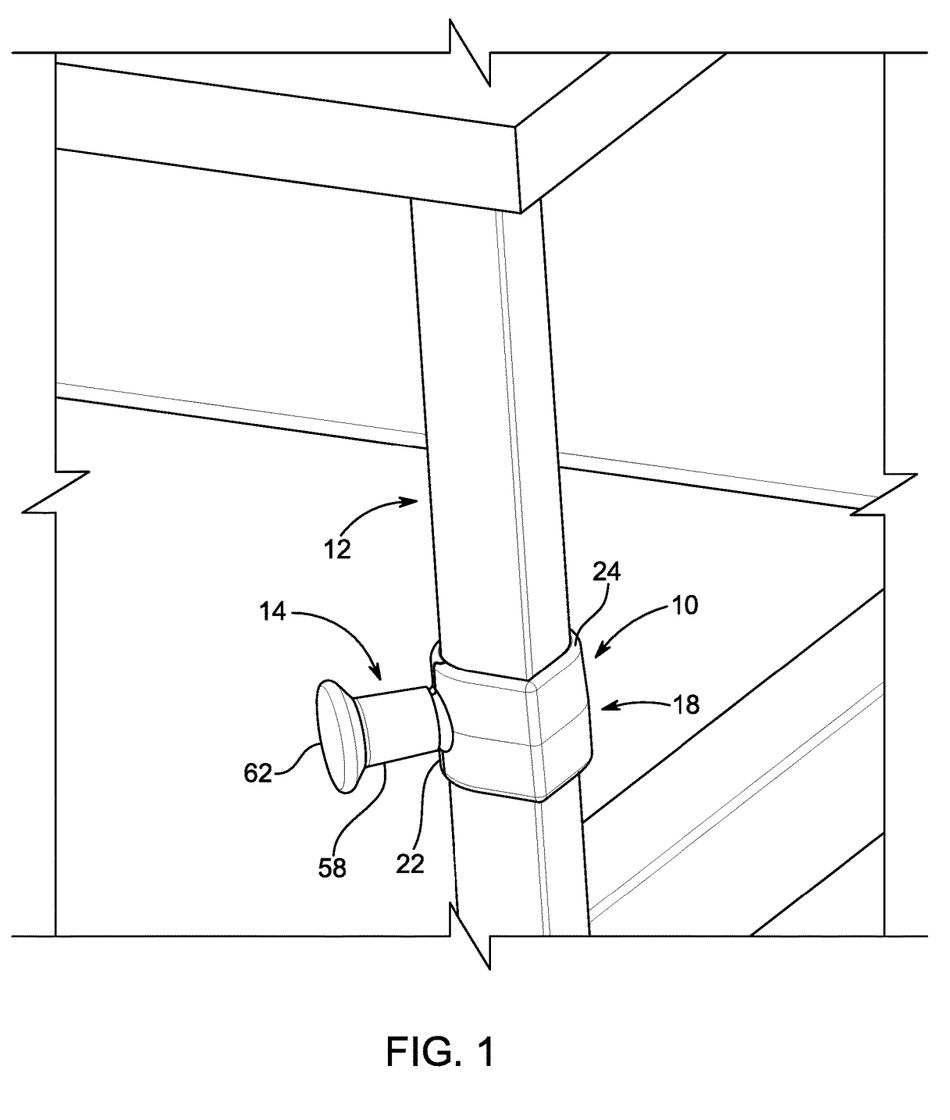
FIG. 1 is a perspective view of an accessory hook on a furniture item according to one embodiment of the invention.
Figure 2:
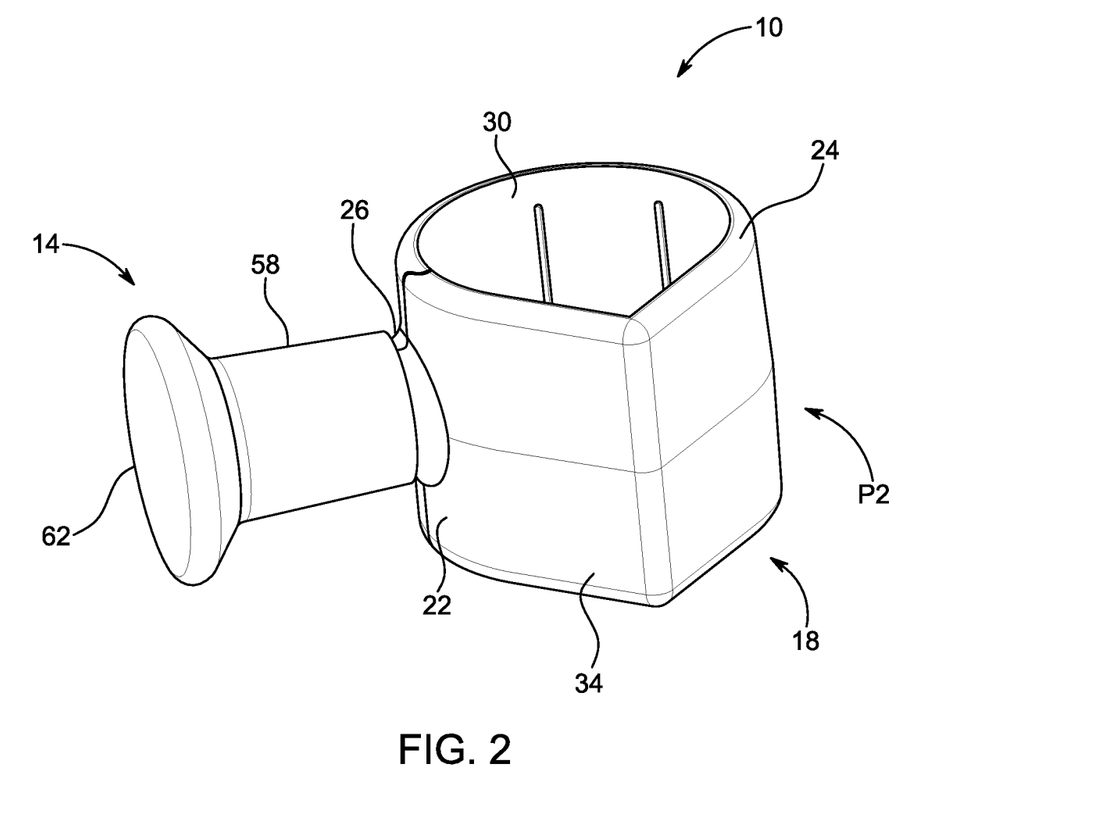
FIG. 2 is a further perspective view of the accessory hook shown in FIG. 1.
Figure 3:
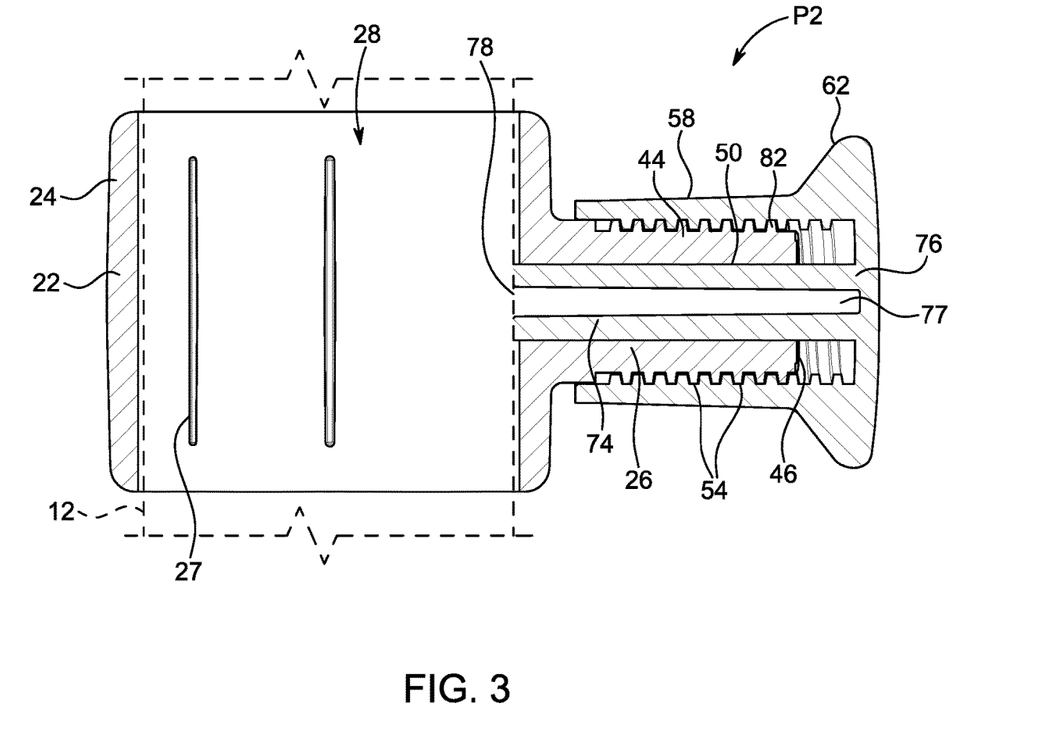
FIG. 3 is a cross-sectional view of the accessory hook shown in FIG. 1.

As shown in FIGS. 2-3, the illustrated accessory hook 10 includes a support 14 and a clamp 18. The clamp 18 has a collar 22 and a projection 26. The projection 26 extends from the collar 22. More particularly, the projection 26 extends radially outward from the collar 22. In the illustrated embodiment, the projection 26 and the collar 22 are integrally formed as a single piece. In other embodiments, the projection 26 and the collar 22 may be separate pieces that are permanently or releasably secured together. The collar 22 is elastically deformable to temporarily separate the projection 26. In some embodiments, the collar 22 and the projection 26 are formed of plastic. In other embodiments, the collar 22 and the projection 26 may be formed of other resilient or deformable materials, such as rubber or metal, and/or the collar 22 and the projection 26 may be formed of different materials from each other. The collar 22 wraps around part of the furniture item 12 (FIG. 1) to couple the accessory hook 10 the furniture item.

Figure 4:
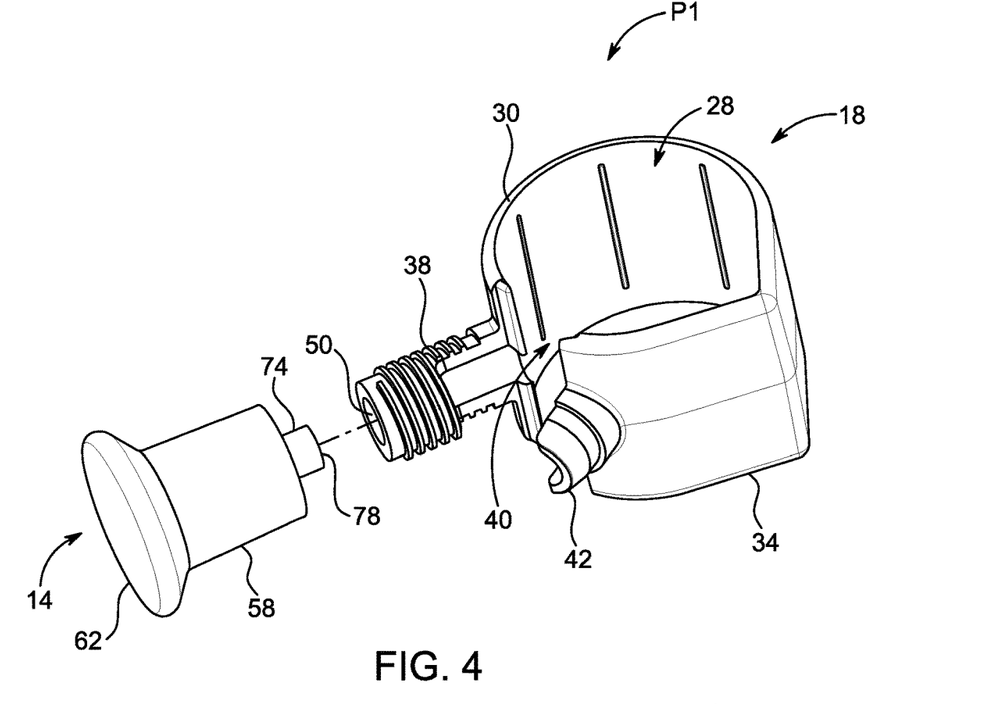
FIG. 4 is an exploded perspective view of the accessory hook shown in FIG. 1 with a clamp of the accessory hook in an open position.
Figure 5:
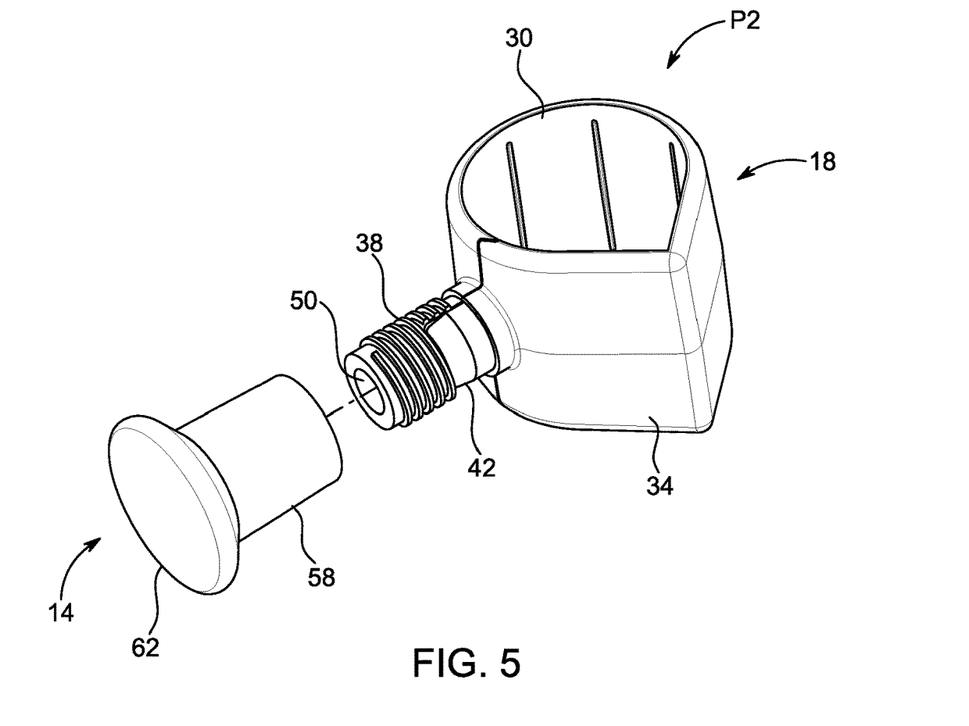
FIG. 5 is an exploded perspective view of the accessory hook shown in FIG. 1 with the clamp of the accessory hook in a closed position.
Figure 6:
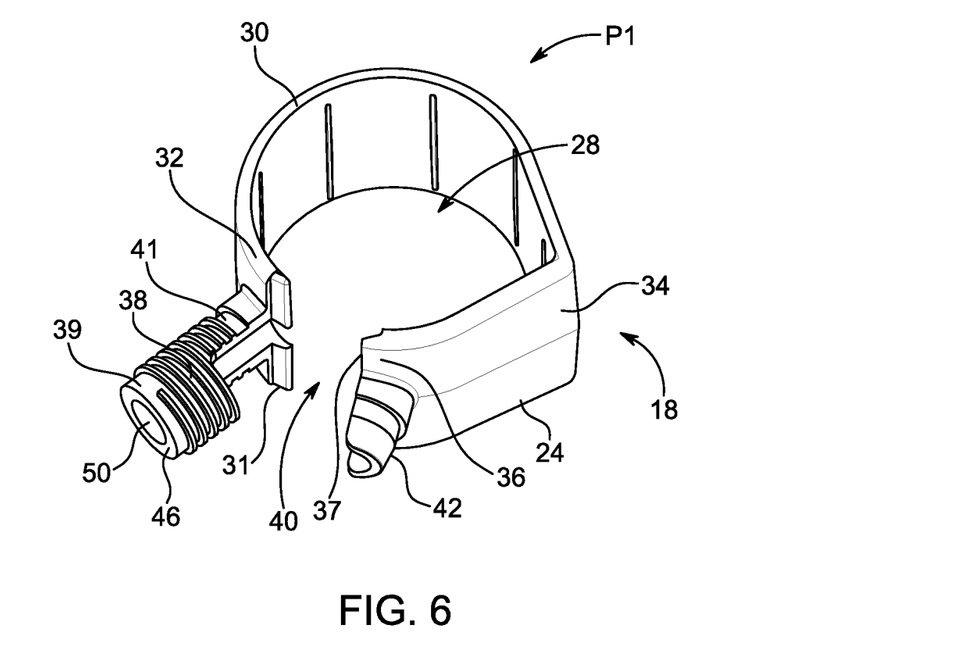
FIG. 6 is a perspective view of the clamp of the accessory hook shown in FIG. 1 in the open position.
Figure 7:
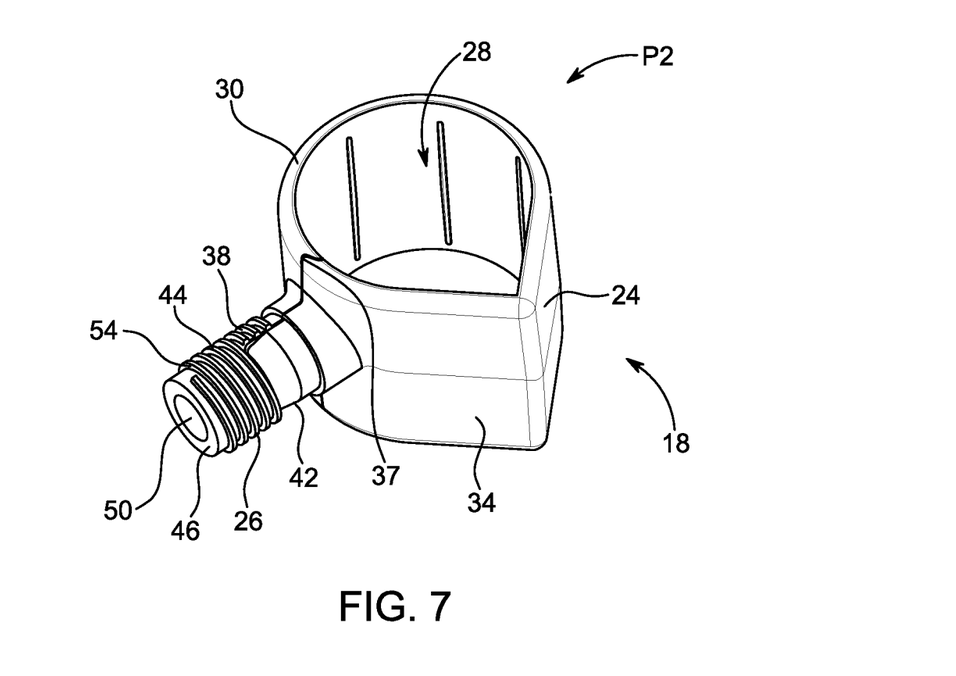
FIG. 7 is a perspective view of the clamp of the accessory hook shown in FIG. 1 in the closed position.

FIGS. 4-7 illustrate the clamp 18. The clamp 18 is moveable between an open position P1 (FIGS. 4 and 6) and a closed position P2 (FIGS. 5 and 7). The clamp 18 is biased toward the open position P1. In the illustrated embodiment, the collar 22 is teardrop shaped to match a shape of the leg of the furniture item 12 (FIG. 1). In other embodiments, the collar 22 may be circular, square, or any suitable shape to match the desired furniture item. The collar 22 includes a rounded thin wall 24. In the illustrated embodiment, the thin wall 24 varies in thickness along its axial length or height. For example, as shown in FIG. 3, the illustrated thin wall 24 is slightly thicker at a midsection than at a top and bottom. In other embodiments, the thin wall 24 may not vary in thickness. The thin wall 24 defines an interior space 28 that receives the furniture item 12. The collar 22 also includes a plurality of ribs 27. The ribs 27 are formed on an inner surface of the thin wall 24 and protrude into the interior space 28. Each rib 27 extends axially along the collar 22. In other embodiments, the ribs 27 may extend circumferentially along the collar 22. The ribs 27 help grasp the furniture item 12. In the closed position P1, the thin wall 24 is continuous. In the open position P2, the thin wall 24 is at least partially separated.

The collar 22 has a first region 30 and a second region 34. The first region 30 defines a first end 32 of the thin wall 24. The second region 34 defines a second end 36 of the thin wall 24. The first and second regions 30, 34 are integrally connected together opposite from the first and second ends 32, 36 such that the collar 22 may bend or flex between the open position P1 and the closed position P2. In other embodiments, the collar 22 may include a hinge or other structure to connect the first and second regions 30, 34. The collar 22 is biased toward the open position P1 such that the first end 32 of the thin wall 24 is separated from the second end 36 of the thin wall 24, forming a gap 40 between the first and second ends 32, 36. The collar 22 includes a first ridge 31 at the first end 32 of the thin wall 26 and a second ridge 37 at the second end 36 of the thin wall 24. The second ridge 37 is configured to overlap the first ridge 31 when the collar 22 is in the closed position P2 such that the thin wall 24 forms a continuous, closed loop. In other embodiments, the ridges 31, 37 may be omitted such that the first and second ends 32, 36 of the thin wall 24 abut each other when the collar 22 is in the closed position P2.

The projection 26 includes a first portion 38 extending from the first region 30 of the collar 22 and a second portion 42 extending from the second region 34 of the collar 22. The first portion 38 of the projection 26 is positioned at the first end 32 of the thin wall 24. The second portion 42 of the projection 26 is positioned at the second end 36 of the thin wall 24. The first portion 38 is also disposed adjacent the first ridge 31 of the collar 22, while the second portion 42 is disposed adjacent the second ridge 37 of the collar 22. In the illustrated embodiment, the first portion 38 is larger than the second portion 42. In other embodiments, the portions 38, 42 may also be equal in size. The first portion 38 includes a first segment 39 having an annular cross-section and a second segment 41 with a semi-annular cross-section. The second portion 42 has a semi-annular cross-section. When in the open position P1 (FIGS. 4 and 6), the first and second portions 38, 42 are separated from each other to define the gap 40. When in the closed position P2 (FIGS. 5 and 7), the second portion 42 is received in a cutout area of the first portion 38 to close the gap 40. The first portion 38 and the second portion 42 together define a boss 44. The illustrated boss 44 is cylindrical and forms the projection 26. The projection 26 includes a free or distal end 46 opposite from the collar 22. The projection 26 also includes an opening 50 extending from the free end 46. The opening 50 extends from the free end 46 toward the interior space 28. As shown in FIG. 3, in the illustrated embodiment, the opening 50 extends from the free end 46 to the interior space 28. The illustrated opening 50 has a circular cross section, but may alternatively have other suitable shapes.

Referring back to FIGS. 4-7, the illustrated projection 26 includes threads 54. The threads 54 are formed on the boss 44 such that the boss 44 is a threaded boss. In the illustrated embodiment, the threads 54 are external threads 54 formed on an outer surface of the projection 26. In other embodiments, the threads 54 may be internal threads disposed in the opening 50 of the projection 26. In the illustrated embodiment, the first portion 38 includes a majority of the threads 54, while the second portion 42 includes a single enlarged thread or groove that aligns with the threads 54 on the first portion 34 when then clamp 18 is in the closed position P2. In other embodiments, the second portion 42 may also include the threads 54.

FIGS. 4 and 6 illustrate the clamp 18 in the open position P1. In the open position P1, the gap 40 is formed between the first end 32 of the collar 22 and the second end 36 of the collar 22. The gap 40 is also formed between the first portion 38 of the projection 26 and the second portion 42 of the projection 26. In this position, the collar 22 may be wrapped around the furniture item 12 (or part of the furniture item 12) by inserting the furniture item 12 through the gap 40.

FIGS. 5 and 7 illustrate the clamp 18 in the closed position P2. In the closed position P2, the first end 32 of the collar 22 engages the second end 36 of the collar 22 such that the gap 40 is closed. In the closed position P2, the first portion 38 of the projection 26 abuts the second portion 42 of the projection 26 to form the boss 44. More particularly, the second portion 42 abuts the second segment 41 of the first portion 38 so that the projection 26 has an annular cross section. When the gap 40 is closed, the second ridge 37 overlaps the first ridge 31 to form the continuous wall 24.

Figure 8:
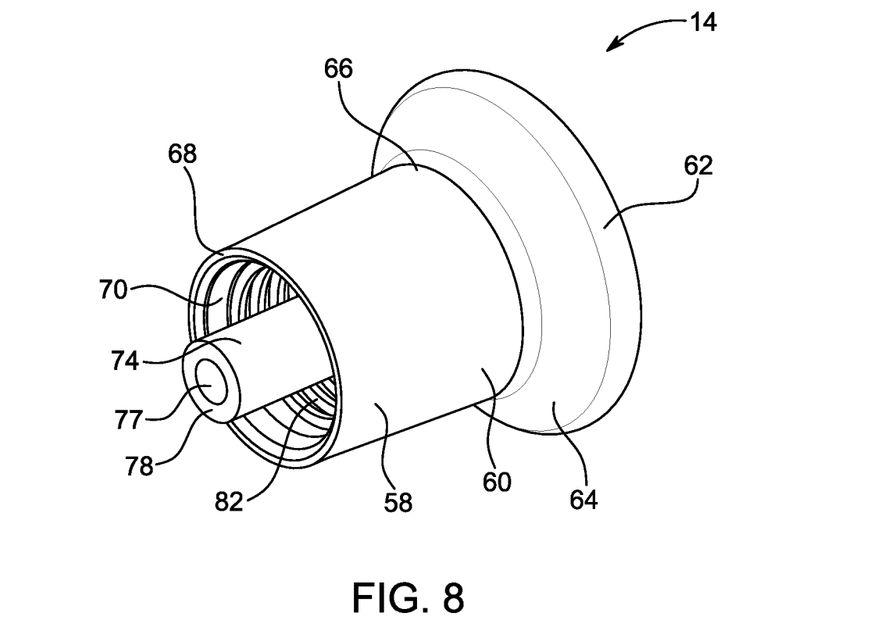
FIG. 8 is a rear perspective view of a support of the accessory hook shown in FIG. 1.
Figure 9:
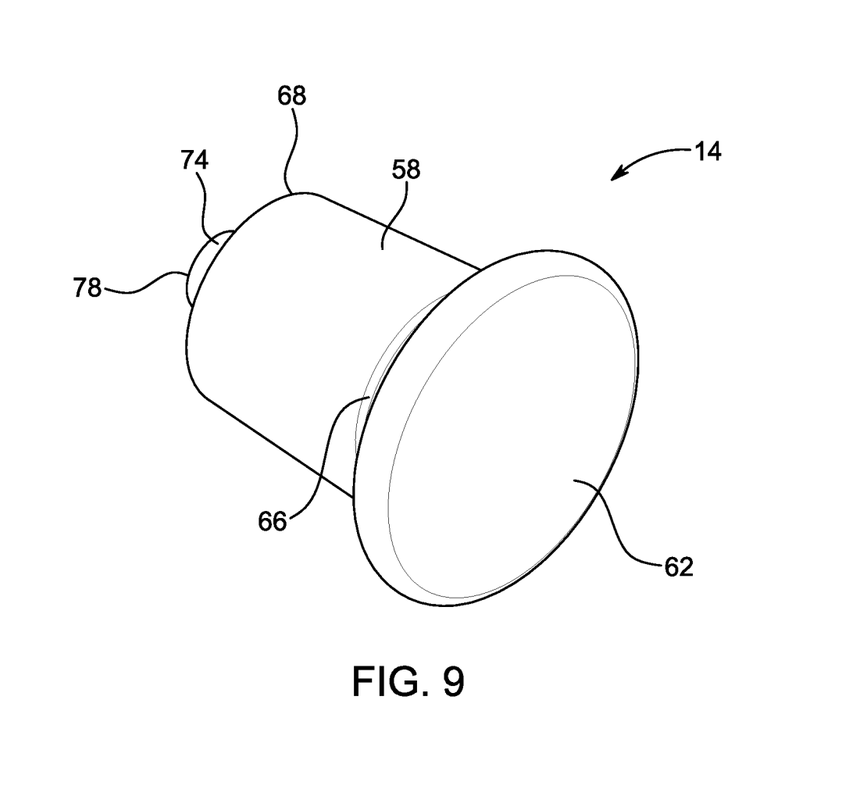
FIG. 9 is a front perspective view of a support of the accessory hook shown in FIG. 1.

FIGS. 8 and 9 illustrate the support 14. The support 14 is configured to hold one or more of the accessories. In the illustrated embodiment, the support 14 is knob-shaped. In other embodiments, the support 14 may have other suitable shapes or forms. For example, the support 14 may be hook-shaped, may include a clip, may include a magnet, may be ridged, may have a sawtooth profile, and the like. The support 14 has a sleeve 58. The illustrated support 14 includes a flange 62 at a first end 66 of the sleeve 58. An outer diameter of the flange 62 is larger than the largest outer diameter of the sleeve 58. The flange 62 includes a tapered portion 64 extending from an outer surface 60 of the sleeve 58. The support 14 also includes a recess 70 formed in a second end 68 of the sleeve 58 opposite the first end 66 of the sleeve 58. The recess 70 has a circular cross section. The recess 70 defines a central axis. The recess 70 is configured to receive the projection 26 of the clamp 18. In the illustrated embodiment, the sleeve 58 tapers toward the second end 68 of the sleeve 58. In particular, the sleeve 58 decreases in diameter as it extends from the flange 62 toward the second end 68. In other embodiments, the sleeve 58 may have no taper.

The support 14 further includes a pin 74 positioned at least partially within the recess 70. The pin 74 includes a first end 76 (FIG. 3) inside the recess 70 of the sleeve 58 and a second end 78 outside the recess 70. The pin 74 extends out of the recess 70 past the second end 68 of the sleeve 58. The pin 74 is cylindrical and has a circular cross-section. The circular cross-section of the recess 70 and the circular cross-section of the pin 74 are concentric. The pin 74 includes an inner recess 77. The inner recess 77 is formed in the second end 78 of the pin 74. In the illustrated embodiment, the inner recess 77 has a circular cross-section. In other embodiments, the inner recess 77 may have other cross-section shapes, such as a square or oval. The cross-section of the inner recess 77 and the cross-section of the pin 74 are concentric. The pin 74 is configured to be inserted into the opening 50 of the projection 26 of the clamp 18. In other embodiments, the pin 74 and the recess 70 may have other suitable shapes to match the projection 26 of the clamp 18.

The sleeve 58 has threads 82. The threads 82 of the sleeve 58 are positioned within the sleeve 58. The threads 82 are positioned around the recess 70 of the sleeve 58. In the illustrated embodiment, the threads 82 are internal threads. In other embodiments, the threads 82 may be external threads. For example, the threads 82 may be positioned on an outer surface of the pin 74.

FIGS. 1-3 show the accessory hook 10 with the clamp 18 in the closed position P2. When the clamp 18 is wrapped around the part of the furniture item 12, the support 14 engages the projection 26 to secure the clamp 18 on the furniture item 12. In the closed position P2, the support 14 at least partially surrounds the projection 26 to hold the first portion 38 and the second portion 42 together. In the closed position P2, the sleeve 58 receives the projection 26 of the clamp 18 to inhibit separation of the first and second portions 38 and 42. More specifically, the recess 70 of the sleeve 58 receives the projection 26 of the clamp 18. In the illustrated embodiment, the support 14 and the projection 26 are threadably coupled together. The threads 82 of the sleeve 58 engage the threads 54 of the projection 25 to inhibit removal of the support 14 off of the projection 25, and, thereby, separation of the first and second portions 38 and 42. In other embodiments, the support 14 may be coupled to the projection 26 by other suitable means. For example, the support 14 may slide onto the projection 26 and engage the projection 26 by a friction fit, a magnetized connection, and the like.

When the support 14 is coupled to the projection, the pin 74 is received within the opening 50 of the projection 26. The second end 78 of the pin 74 extends into the interior space 28 of the collar 22. In this position, the second end 78 presses against the furniture item 12. The second end 78 of the pin 74 applies pressure to the furniture item 12 to help hold the clamp 18 in position on the furniture item 12.

To install the accessory hook 10 on a furniture item 12, the clamp 18 is wrapped around the furniture item 12 and held in the closed position P2. In some embodiments, the clamp 18 may snap around the furniture item due to the material of the clamp 18 (e.g., plastic). When the clamp 18 is being held in the closed position P2, the support 14 is coupled to (e.g., threaded onto) the projection 26 of the clamp 18 to prevent the clamp 18 from moving from the closed position P2 to the open position P1. One or more accessories may then be hung from the support 18.

Various features and advantages of the invention are set forth in the following claims.

What is claimed is:

1. An accessory hook comprising:
a support; and
a clamp being moveable between an open position and a closed position, the clamp having
a collar including a first region and a second region, and
a projection including a first portion extending from the first region of the collar and a second portion extending from the second region of the collar,
wherein, in the open position, a gap is formed between the first portion of the projection and the second portion of the projection,
wherein, in the closed position, the gap is closed and the support at least partially surrounds the projection to hold the first portion and the second portion together,
wherein the projection includes a free end and an opening extending from the free end, wherein the support includes a sleeve having a recess and a pin positioned at least partially within the recess, and wherein the projection is received within the recess of the sleeve and the pin is received within the opening of the projection when the clamp is in the closed position.

2. The accessory hook of claim 1, wherein the support includes a sleeve having first threads, wherein the projection includes second threads, and wherein the first threads of the sleeve engage the second threads of the projection when the clamp is in the closed position.

3. The accessory hook of claim 1, wherein the opening extends to an interior space of the collar, wherein the pin includes a first end inside the recess of the sleeve and a second end outside the recess of the sleeve, and wherein the second end of the pin extends into the interior space of the collar.

4. The accessory hook of claim 1, wherein the sleeve includes internal threads, wherein the projection includes external threads, and wherein the internal threads engage the external threads when the clamp is in the closed position.

5. The accessory hook of claim 1, wherein the support includes a sleeve and a flange at a first end of the sleeve.

6. The accessory hook of claim 5, wherein the support includes a recess formed in a second end of the sleeve opposite the first end of the sleeve.

7. The accessory hook of claim 6, wherein, in the closed position, the recess of the sleeve receives the projection of the clamp.

8. The accessory hook of claim 1, wherein the collar is elastically deformable, and wherein the clamp is biased toward the open position.

9. The accessory hook of claim 1, wherein the projection and the collar are integrally formed as a single piece.

10. An accessory hook comprising:
a support having a sleeve, the sleeve having a recess and first threads positioned within the sleeve, and
a clamp having
a collar including a first region and a second region, and
a projection including a first portion extending from the first region of the collar and a second portion extending from the second region of the collar, the first portion and the second portion together defining a boss having second threads,
wherein the first portion includes the second threads and the second portion includes an enlarged groove that aligns with the second threads when the clamp is in a closed position, and
wherein the sleeve receives the projection and the first threads engage the second threads of the boss to inhibit separation of the first and second portions.

11. The accessory hook of claim 10, wherein the projection includes a free end and an opening extending from the free end, wherein the support includes a pin positioned at least partially within the recess, and wherein the pin is received within the opening of the projection.

12. The accessory hook of claim 11, wherein the opening extends to an interior space of the collar, wherein the pin includes a first end inside the recess of the sleeve and a second end outside the recess of the sleeve, and wherein the second end of the pin extends into the interior space of the collar.

13. The accessory hook of claim 10, wherein the first threads are internal threads, and wherein the second threads are external threads.

14. The accessory hook of claim 10, wherein the collar is elastically deformable to move the first portion of the projection relative to the second portion of the projection.

15. An accessory hook for use with a furniture item, the accessory hook comprising:
a support; and
a clamp having
a collar including a first region and a second region, and
a projection including a first portion extending from the first region of the collar and a second portion extending from the second region of the collar, the second portion having a semi-annular cross section, the first portion including a first segment having an annular cross-section and a second segment having a semi-annular cross-section defining a cutout area configured to receive the second portion, wherein the first portion of the projection and the second portion of the projection are selectively movable relative to each other to form a gap therebetween, wherein the collar is elastically deformable and configured to wrap around part of the furniture item by inserting the part of the furniture item through the gap, and wherein the support engages the projection while the clamp is wrapped around the part of the furniture item to secure the clamp on the furniture item.

16. The accessory hook of claim 15, wherein the projection includes a free end and an opening extending from the free end, wherein the support includes a sleeve having a recess and a pin positioned at least partially within the recess, and wherein the projection is received within the recess of the sleeve and the pin is received within the opening of the projection.

17. The accessory hook of claim 16, wherein the opening extends to an interior space of the collar, wherein the pin includes a first end inside the recess of the sleeve and a second end outside the recess of the sleeve, wherein the second end of the pin extends into the interior space of the collar and is configured to apply pressure to the furniture item.

18. The accessory hook of claim 15, wherein the support includes a sleeve and a flange at a first end of the sleeve.

19. The accessory hook of claim 18, wherein the support includes a recess formed in a second end of the sleeve opposite the first end of the sleeve, and wherein the recess of the sleeve receives the projection of the clamp.

* * * * *